Patented Mar. 31, 1925.

1,531,464

UNITED STATES PATENT OFFICE.

ROBERT LAUDER MACKENZIE WALLIS, OF ST. JOHN'S WOOD, LONDON, ENGLAND, ASSIGNOR TO ATMOSTEROL, LIMITED, OF LEIGH-ON-SEA, ENGLAND.

ANTISEPTIC, DISINFECTANT, OR PRESERVATIVE AGENT.

No Drawing.     Application filed August 29, 1921. Serial No. 496,643.

*To all whom it may concern:*

Be it known that I, ROBERT LAUDER MACKENZIE WALLIS, a subject of the King of Great Britain and Ireland, and residing at 55 Townshend Road, St. John's Wood, London, NW. 8, England, have invented certain new and useful Improvements in and Relating to the Employment of Antiseptic, Disinfectant, or Preservative Agents, of which the following is a specification.

This invention relates to the employment of antiseptic, disinfectant or preservative agents, and particularly to those which are normally solid.

Experience has shown that considerable difficulties are experienced in securing the effective distribution of disinfectant or preservative agents which are normally solid and which are insoluble in the fluid portions of the bodies or materials in the treatment of which they are employed.

This is particularly the case with volatile organic antiseptic agents or disinfectants which are normally crystalline solids and more especially with those which volatilize at temperatures below their melting points as, for instance, thymol.

In employing such antiseptic agents and disinfectants, it is wholly impracticable in many cases to soak the material to be treated in a solution or emulsion of the antiseptic agent or disinfectant and consequently attempts have been made to apply them by subjecting the material to be treated to the action of such agents in the form of vapour or in an atomized state. These methods of using such agents are, however, not wholly satisfactory as the vapour condenses or the particles of atomized material coalesce to form relatively large drops or crystalline particles with the result that the material rapidly condenses and collects on the floors or walls of the chamber or vessel in which the treatment is carried out, and therefore does not come into contact with the whole of the material it is desired to treat, or it condenses or collects on the material in relatively large particles with the result that while some portions of the surface of the material are treated with the antiseptic or disinfectant agent, there are relatively large areas which are not so treated intervening between such portions.

According to the present invention the antiseptic or disinfectant agents are employed in association with conveyors or distributing agents.

Thus, in accordance with the invention an antiseptic or disinfectant agent which is to be employed in the form of vapour or in the atomized state is employed in association with a body adapted to act as a conveyor or distributing agent, in that it restrains the drops or particles of the agent from coalescing and assists in uniformly distributing the agent over the surface of the material to be treated.

The materials employed as conveyors or distributing agents preferably possess in a relatively small degree the capacity to coagulate or harden albumens but not definitely to effect the precipitation of such bodies.

In carrying the present invention into effect an alcohol, aldehyde, or allied body having a relatively high molecular weight may be employed.

I may, for instance, employ an aliphatic alcohol of relatively high molecular weight as, for instance, butyl alcohol, which acts as a solvent for thymol, carvacrol and other bodies allied with the terpenes or which may be derived from vegetable sources or the homologues or isomers of such bodies synthetically produced or not.

Butyl alcohol, it has been found, for instance, not merely acts as a solvent for such bodies but also enables them to be emulsified with water and the alcohol further does not possess the property of coagulating protein or other bodies contained in the blood of animals as is possessed by the lower alcohols, for instance, ethyl alcohol and the lower aldehydes. Butyl alcohol has been found to aid considerably in forming a mist or fog when, for instance, a solution of thymol or the like in butyl alcohol is vaporized or atomized into a chamber and therefore it enables the material contained therein to be more thoroughly subjected to the action of the antiseptic agent or disinfectant than when the use of a carrier or distributing agent is dispensed with.

The invention is further based upon the observation that phenols, particularly the higher phenols such as thymol, carvacrol and the like and other phenolic bodies yield with the higher aliphatic monohydric alcohols under the action of oxygen bodies or compositions possessing powerful antiseptic properties.

This phase of the invention may be explained by reference to thymol.

This compound I have found apparently yields with higher alcohols under the action of oxygen or other oxidizing agents bodies of obscure chemical composition which possess powerful antiseptic properties.

When, for instance, a mixture of butyl alcohol and thymol in certain proportions as, for instance, 100 ccs. butyl alcohol and 100 gms. thymol, is allowed to stand in contact with air, a reddish oily liquid is formed, apparently in consequence of certain changes produced by oxidation.

An oily liquid of a similar character may be produced in accordance with the invention by adding to a mixture of thymol and butyl alcohol an oxidizing agent, such as hydrogen peroxide or ozonic ether.

By the employment of other higher alcohols as, for instance, propyl and amyl alcohol instead of butyl alcohol, similar results may be obtained.

These oily liquids mix with water to form emulsions. They are themselves powerful antiseptics as also are their emulsions with water.

The emulsions may be diluted in accordance with the invention and protective colloids or emulsifying agents, such as soap, may if desired be incorporated therewith.

As evidence in support of the view that new compounds are formed in the conditions referred to, the following facts may be adduced:—

(1) Change of colour;
(2) Change of odour, the reddish oil being substantially odourless;
(3) On heating the odour returns and the mixture becomes colourless;
(4) On distillation a liquid product is obtained which on standing develops heat, solid thymol separating out.

Meat may be preserved in accordance with the invention with the aid of this and like bodies and it is found that the presence of oxygen may be desirable when these bodies are employed for this purpose.

When, for instance, the meat is packed, hung or otherwise stored in a chamber, additional oxygen may be supplied to the atmosphere in the chamber.

The introduction of such additional oxygen may be effected intermittently or continuously so as to replace that which may be absorbed or consumed by the material stored or so as to maintain in the chamber an atmosphere containing a larger proportion of oxygen than is present in air.

The oily compound obtained in accordance with the invention may be employed by vaporizing or atomizing the material or emulsions thereof without the application of heat and subjecting the meat to the action of the material in the vaporized or atomized state in conjuction with cold storage or not.

The material may be atomized by the employment of oxygen under pressure, as in this way the supply of oxygen to the surface of the meat may be conveniently effected.

The emulsions in accordance with the invention may be sprayed, brushed or otherwise applied to meat, or the meat may be dipped into the emulsions or the latter may be added to the pickle or liquor employed for curing the meat.

The invention also comprises the use of the material for disinfecting houses, public carriages, places of entertainment, tube railways and other structures used by a number of people, by introducing the material in an atomized state either continuously or intermittently by way of the ventilating system or otherwise.

The invention also extends to the employment of ice obtained by adding the material or an emulsion thereof to water and freezing the water in preserving fish or other material which may be packed in contact with ice.

The process which comprises bringing together phenols and particularly higher phenols such as thymol, carvacrol and the like and other phenolic bodies in the presence of oxygen or other suitable oxidizing agent may be applied in accordance with the invention to the production of such bodies, in a pure state by first forming the oxygen compound and then decomposing it under the action of heat.

Thus, for instance, commercial thymol may be brought together with butyl alcohol in the presence of oxygen or a suitable oxidizing agent, in the manner above indicated, and the oily product then subjected to distillation, preferably under reduced pressure. The first fraction of the distillate will consist mainly of butyl alcohol, after which a higher boiling fraction will be obtained from which, as above indicated, thymol will separate out in large clear crystals, the residue in the distillation vessel containing the impurities present in the crude thymol.

From the work I have carried out it would appear that the higher alcohols and certain other bodies or classes of bodies referred to as conveyors or distributing agents, enter into chemical combination with the thymol or other preservative agents and oxygen, yielding compounds such as are described herein, and that the better results which are obtained in accordance with the process described in the British provisional specification No. 15974, dated June 12th, 1920, as compared with the results obtained when, for instance, thymol alone is used, are to be attributed to the formation of such compounds as are produced by the action of oxygen on the mixture of thymol and butyl alcohol.

For the purposes of the invention the aldehyde of a higher aliphatic monohydric alcohol is the equivalent of the alcohol itself, and where in the claims a higher aliphatic monohydric alcohol is referred to this term is to be understood as including equivalents.

Having now described my invention, what I claim as new and desire to secure by Letters Patent is:—

1. The process of treating perishable foodstuffs, which comprises subjecting them to the action of an oxidation product of a phenolic constituent of an essential oil and a higher aliphatic monohydric alcohol.

2. The process of treating perishable foodstuffs, which comprises subjecting them to the action of an oxidation product of a higher homologue of phenol occurring in an essential oil and an aliphatic monohydric alcohol containing at least four carbon atoms in its molecule.

3. The process of treating perishable foodstuffs, which comprises subjecting them to the action of an oxidation product of thymol and a higher aliphatic monohydric alcohol.

4. The process of treating perishable foodstuffs, which comprises subjecting them to the action of a product of oxidation by free oxygen of a phenolic constituent of an essential oil and a higher aliphatic monohydric alcohol.

5. The process of treating perishable foodstuffs, which comprises subjecting them to the action of a product of oxidation by free oxygen of thymol and an aliphatic monohydric alcohol.

6. The process of treating perishable foodstuffs, which comprises subjecting them to the action of a product of oxidation by free oxygen of thymol and butyl alcohol.

7. An antiseptic composition, being an oxidation product of a phenolic constituent of an essential oil and an aliphatic monohydric alcohol.

8. An antiseptic composition, being an oxidation product of a higher phenol occurring in an essential oil and an aliphatic monohydric alcohol containing not less than four carbon atoms in its molecule.

9. An antiseptic composition, being an oxidation product of thymol and an aliphatic monohydric alcohol containing not less than four carbon atoms in its molecule.

10. An antiseptic composition, being a product of oxidation by free oxygen of thymol and a butyl alcohol.

In testimony whereof I have signed my name to this specification.

ROBERT LAUDER MACKENZIE WALLIS.